United States Patent
Promel et al.

(10) Patent No.: US 6,225,421 B1
(45) Date of Patent: May 1, 2001

(54) PROCESS FOR THE MANUFACTURE OF A COMPOSITION COMPRISING ETHYLENE POLYMERS

(75) Inventors: Michel Promel; Bruno Moens, both of Brussels (BE)

(73) Assignee: Solvay Polyolefins Europe-Belgium (Societe Anonyme), Brussels (BE)

(*) Notice: Subject to any disclaimer, the term of this patent is extended or adjusted under 35 U.S.C. 154(b) by 0 days.

(21) Appl. No.: 09/136,426

(22) Filed: Aug. 20, 1998

(30) Foreign Application Priority Data

Aug. 20, 1997 (BE) ...................................... 9700694

(51) Int. Cl.⁷ ................................ C08F 2/18; C08F 2/26
(52) U.S. Cl. ................................ 526/65; 526/75; 526/95; 526/114; 526/351
(58) Field of Search ................................ 526/65, 75, 95, 526/114, 351

(56) References Cited

U.S. PATENT DOCUMENTS

| 5,283,300 | * | 2/1994 | Haspeslagh et al. | .................. 526/75 |
| 5,736,237 | * | 4/1998 | Rhee et al. | .................. 426/220 |

FOREIGN PATENT DOCUMENTS

| 195 26 340 A1 | | 1/1997 | (DE) . |
| 0057352A2 | * | 8/1982 | (EP) . |
| 57352 A | | 8/1982 | (EP) . |
| 0503791A1 | * | 9/1992 | (EP) . |
| 0503791 | | 9/1992 | (EP) . |
| 0603935A1 | * | 9/1992 | (EP) . |
| 0 603 935 A1 | | 6/1994 | (EP) . |
| 0 783 022 A1 | | 7/1997 | (EP) . |
| 0783022A1 | * | 7/1997 | (EP) . |
| 0829495A1 | * | 3/1998 | (EP) . |
| WO 97/04025 | * | 7/1996 | (WO) . |

* cited by examiner

Primary Examiner—Bernard Lipman
Assistant Examiner—Tanya Zalukaeva
(74) Attorney, Agent, or Firm—Oblon, Spivak, McClelland, Maier & Neustadt, P.C.

(57) ABSTRACT

Process for the manufacture of a composition comprising ethylene polymers, in at least two polymerization reactors connected in series, according to which, in a first reactor, from 30 to 70% by weight with respect to the total weight of the composition of an ethylene homopolymer (A) having a melt flow index $MI_2$ of 5 to 1000 g/10 min is formed and, in a subsequent reactor, from 30 to 70% by weight with respect to the total weight of the composition of a copolymer of ethylene and of hexene (B) having a melt flow index $MI_5$ of 0.01 to 2 g/10 min is formed. The compositions obtained by this process exhibit a good compromise between the processing properties and the mechanical properties, which renders them capable of being used in the manufacture of articles shaped by extrusion and extrusion blow-molding, such as films and pipes.

9 Claims, No Drawings

PROCESS FOR THE MANUFACTURE OF A COMPOSITION COMPRISING ETHYLENE POLYMERS

The present invention relates to a process for the manufacture of a composition comprising ethylene polymers, comprising a homopolymer and a copolymer of ethylene, which makes use of several polymerization reactors connected in series. It also relates to the compositions comprising ethylene polymers capable of being obtained by this process and to their use in the manufacture of films and pipes.

Patent Application EP-A-0,603,935 (Solvay) discloses a process for the preparation of a composition comprising ethylene polymers comprising an ethylene polymer with a high melt flow index ($MI_2$ of 5 to 1000 g/10 min) and an ethylene polymer with a low melt flow index ($MI_5$ of 0.01 to 2 g/10 min) in at least two reactors arranged in series, the ratio by weight of these polymers being equal to (30 to 70):(70 to 30). This patent application more specifically discloses a composition, prepared in suspension in hexane, comprising an ethylene homopolymer having an $M_2$ of 168 g/10 min and a copolymer of ethylene and of butene having an $MI_5$ of 0.21 g/10 min.

Patent Application EP-A-0,580,930 discloses a process for the preparation of a composition comprising ethylene polymers in two loop reactors in the liquid phase in which, in a first reactor, ethylene and an alpha-olefin, such as hexene, are introduced, so as to prepare a copolymer of ethylene and of hexene having a melt flow index HLMI varying from 0.01 to 5 g/10 min, and then the mixture resulting from the first reactor is introduced into a second reactor fed with ethylene, so as to obtain a polymer of ethylene having an HLMI of greater than 5 g/10 min. As the mixture resulting from the first reactor still comprises unpolymerized hexene, the polymer formed in the second reactor is also a copolymer of ethylene and of hexene.

The compositions resulting from these processes generally exhibit processing and mechanical properties which render them suitable for being used in the manufacture of various shaped articles.

The aim of the present invention is to provide a process for the manufacture of compositions comprising ethylene polymers exhibiting a better compromise between the processing properties and the mechanical properties in comparison with the compositions obtained by the known processes of the state of the art.

The invention consequently relates to a process for the manufacture of a composition comprising ethylene polymers, in at least two polymerization reactors connected in series, according to which:

in a first reactor, ethylene is polymerized in suspension in a mixture comprising a diluent, hydrogen, a catalyst based on a transition metal and a cocatalyst, so as to form from 30 to 70% by weight with respect to the total weight of the composition of an ethylene homopolymer (A) having a melt flow index $MI_2$ of 5 to 1000 g/10 min, the said mixture, additionally comprising the homopolymer (A), is withdrawn from the said reactor and is subjected to a reduction in pressure, so as to degas at least a portion of the hydrogen, then the said at least partially degassed mixture comprising the homopolymer (A), as well as ethylene and 1-hexene and, optionally, at least one other α-olefin, are introduced into a subsequent reactor and the suspension polymerization is carried out therein in order to form from 30 to 70% by weight, with respect to the total weight of the composition, of a copolymer of ethylene and of hexene (B) having a melt flow index $MI_5$ of 0.01 to 2 g/10 min.

For the purposes of the present invention, ethylene homopolymer (A) is understood to denote an ethylene polymer composed essentially of monomer units derived from ethylene and substantially devoid of monomer units derived from other olefins. Copolymer of ethylene and of hexene (B) is understood to denote a copolymer comprising monomer units derived from ethylene and monomer units derived from 1-hexene and, optionally, from at least one other α-olefin. The other α-olefin can be selected from olefinically unsaturated monomers comprising from 3 to 8 carbon atoms (with the exclusion of 1-hexene), such as, for example, propylene, 1-butene, 1-pentene, 3-methyl-1-butene, 3- and 4-methyl-1-pentenes and 1-octene. Preferred α-olefins are propylene, 1-butene and 1-octene and more particularly still 1-butene. The copolymer (B) according to the invention generally comprises at least 90%, in particular at least 94%, by weight of monomer units derived from ethylene. It preferably comprises at least 96% by weight of monomer units derived from ethylene. The content of monomer units derived from 1-hexene in the copolymer (B), hereinafter referred to as hexene content, is generally at least 0.4% by weight, in particular at least 0.6% by weight, values of at least 1% by weight being favourable. The hexene content of the copolymer (B) is usually at most 10% by weight, preferably at most 6% by weight. A hexene content which does not exceed 4% by weight is particularly preferred. For the purposes of the present invention, the hexene content of the copolymer (B) is measured by $^{13}C$ NMR according to the method described in J. C. Randall, JMS-Rev. Macromol. Chem. Phys., C29(2&3), p. 201–317 (1989), that is to say that the content of units derived from hexene is calculated from the measurements of the integrals of the lines characteristic of hexene (23.4, 34.9 and 38.1 ppm), in comparison with the integral of the line characteristic of the units derived from ethylene (30 ppm). A copolymer (B) composed essentially of monomer units derived from ethylene and from 1-hexene is particularly preferred.

For the purposes of the present invention, melt flow index $MI_2$, respectively $MI_5$, is understood to denote the melt flow indices measured according to ASTM Standard D 1238 (1986) at a temperature of 190° C. under a load of 2.16 kg, respectively 5 kg. Furthermore, melt flow index HLMI is understood to denote the melt flow index measured according to ASTM Standard D 1238 (1986) at a temperature of 190° C. under a load of 21.6 kg.

The homopolymer (A) according to the invention preferably exhibits an $MI_2$ of at least 50, very particularly of at least 90, g/10 min. The $MI_2$ of the homopolymer (A) preferably does not exceed 700 g/10 min. The homopolymer (A) advantageously exhibits an HLMI of at least 100 g/10 min.

The homopolymer (A) advantageously exhibits an intrinsic viscosity $\eta_A$ (measured in tetrahydronaphthalene at 160° C.) of at least 0.50 dl/g, preferably of at least 0.58 dl/g. Its intrinsic viscosity generally does not exceed 1.50 dl/g, preferably it does not exceed 1.00 dl/g. A homopolymer for which $\eta_A$ does not exceed 0.86 dl/g is particularly preferred.

The melt flow index $MI_5$ of the copolymer (B) according to the invention is preferably at least 0.015 g/10 min. It preferably does not exceed 0.1 g/10 min. The copolymer (B) advantageously exhibits an HLMI of at least 0.1 g/10 min which, furthermore, does not exceed 20 g/10 min.

The copolymer (B) generally exhibits an intrinsic viscosity $\eta_B$ (measured in tetrahydronaphthalene at 160° C.) of at least 2.20 dl/g. Its intrinsic viscosity $\eta_B$ generally does not exceed 6.30 dl/g, preferably not 5.90 dl/g. A copolymer (B) for which the intrinsic viscosity does not exceed 4.00 dlg is particularly preferred.

Suspension polymerization is understood to denote the polymerization in a diluent which is in the liquid state under the polymerization conditions (temperature, pressure) used, these polymerization conditions or the diluent being such that at least 50% by weight (preferably at least 70%) of the polymer formed is insoluble in the said diluent.

The diluent used in the polymerization process according to the invention is usually a hydrocarbon-comprising diluent which is inert with respect to the catalyst, the cocatalyst and the polymer formed, such as, for example, a linear or branched alkane or a cycloalkane having from 3 to 8 carbon atoms. The diluent which has given the best results is isobutane. One advantage of the use of isobutane lies in particular in its ready recycling. This is because the use of isobutane makes it possible to recycle the diluent recovered at the end of the process according to the invention in the first reactor without having to carry out exhaustive purification in order to remove the residual hexene. This is because, as the boiling temperatures of isobutane and of hexene are far apart, their separation can be carried out by distillation.

The amount of ethylene introduced into the first polymerization reactor and into the subsequent polymerization reactor is generally adjusted so as to obtain a concentration of ethylene in the diluent of 5 to 50 g of ethylene per kg of diluent.

The amount of hydrogen introduced into the first reactor is generally adjusted so as to obtain, in the diluent, a molar ratio of hydrogen to ethylene of 0.05 to 1. In the first reactor, this molar ratio is preferably at least 0.1. A hydrogen/ethylene molar ratio which does not exceed 0.6 is particularly preferred.

The mixture withdrawn from the first reactor, additionally comprising the homopolymer (A), is subjected to a reduction in pressure so as to remove (degas) at least a portion of the hydrogen. The reduction in pressure is advantageously carried out at a temperature of less than or equal to the polymerization temperature in the first reactor. The temperature at which the reduction in pressure is carried out is usually greater than 20° C.; it is preferably at least 40° C. The pressure at which the reduction in pressure is carried out is less than the pressure in the first reactor. The pressure-reduction pressure is preferably less than 1.5 MPa. The pressure-reduction pressure is usually at least 0.1 MPa. The amount of hydrogen still present in the at least partially degassed mixture is generally less than 1% by weight of the amount of hydrogen initially present in the mixture withdrawn from the first polymerization reactor; this amount is preferably less than 0.5%. The amount of hydrogen present in the partially degassed mixture introduced into the subsequent polymerization reactor is consequently low, or even zero. The subsequent reactor is preferably also fed with hydrogen. The amount of hydrogen introduced into the subsequent reactor is generally adjusted so as to obtain, in the diluent, a molar ratio of hydrogen to ethylene of 0.001 to 0.1. This molar ratio is preferably at least 0.004 in this subsequent reactor. It preferably does not exceed 0.05. In the process according to the invention, the ratio of the concentration of hydrogen in the diluent in the first reactor to the concentration in the subsequent polymerization reactor is usually at least 20, preferably at least 30. A ratio of concentrations of at least 40 is particularly preferred. This ratio usually does not exceed 300, preferably not 200.

The amount of 1-hexene introduced into the subsequent polymerization reactor is such that, in this reactor, the hexene/ethylene molar ratio in the diluent is at least 0.05, preferably at least 0.1. The amount of hexene introduced into the subsequent reactor is such that the hexene/ethylene molar ratio does not exceed 3, preferably not 2.8. In the process according to the invention, the first reactor is not fed with hexene. It is essential that the first reactor is essentially devoid of 1-hexene. Consequently, the diluent introduced into the first reactor, which can be recycled diluent, must be highly depleted in hexene. The diluent introduced into the first reactor preferably contains less than 1000 ppm of hexene. In a particularly preferred way, the diluent introduced into the first polymerization reactor is essentially devoid of hexene.

The catalyst used in the process according to the invention comprises at least one transition metal. Transition metal is understood to denote a metal from Groups 4, 5 or 6 of the Periodic Table of the Elements (CRC Handbook of Chemistry and Physics, 75th edition, 1994–95). The transition metal is preferably titanium and/or zirconium. Titanium is particularly preferred. In the process according to the invention, use is preferably made of a catalyst comprising, in addition to the transition metal, magnesium. Good results have been obtained with catalysts comprising:

from 10 to 30%, preferably from 15 to 20%, by weight of transition metal,
from 0.5 to 20%, preferably from 1 to 10%, by weight of magnesium,
from 20 to 60%, preferably from 30 to 50%, by weight of halogen, such as chlorine,
from 0.1 to 10%, preferably from 0.5 to 5%, by weight of aluminium; the balance generally being composed of elements originating from the products used in their manufacture, such as carbon, hydrogen and oxygen.

These catalysts are preferably obtained by coprecipitation of at least one transition metal compound and of a magnesium compound by means of a halogenated organoaluminium compound. Such catalysts are known; they have been disclosed particularly in patents U.S. Pat. Nos. 3,901,863, 4,929,200 and 4,617,360 (Solvay). In the process according to the invention, the catalyst is preferably introduced solely into the first polymerization reactor, that is to say that fresh catalyst is not introduced into the subsequent polymerization reactor. The amount of catalyst introduced into the first reactor is generally adjusted so as to obtain an amount of at least 0.5 mg of transition metal per litre of diluent. The amount of catalyst usually does not exceed 100 mg of transition metal per litre of diluent.

The cocatalyst employed in the process according to the invention is preferably an organoaluminium compound. Non-halogenated organoaluminium compounds of formula $AlR_3$ in which R represents an alkyl group having from 1 to 8 carbon atoms are preferred. Triethylaluminium and tri-isobutylaluminium are particularly preferred. The cocatalyst is introduced into the first polymerization reactor. It is also possible to introduce fresh cocatalyst into the subsequent reactor. The amount of cocatalyst introduced into the first reactor is generally at least $0.1 \times 10^{-3}$ mol per litre of diluent. It usually does not exceed $5 \times 10^{-3}$ mol per litre of diluent. If appropriate, the amount of fresh cocatalyst introduced into the subsequent reactor usually does not exceed $5 \times 10^{-3}$ mol per litre of diluent.

The polymerization temperature is generally from 20 to 130° C. It is preferably at least 60° C. It preferably does not exceed 115° C. The total pressure at which the process according to the invention is carried out is generally from 0.1 MPa to 10 MPa. In the first polymerization reactor, the total pressure is preferably at least 2.5 MPa. It preferably does not exceed 5 MPa. In the subsequent polymerization reactor, the total pressure is preferably at least 1.3 MPa. It preferably does not exceed 4.3 MPa.

The duration of polymerization in the first reactor and in the subsequent reactor is generally at least 20 minutes, preferably at least 30 minutes. The duration of polymerization usually does not exceed 5 hours, preferably not 3 hours.

In order to carry out the process according to the invention, it is possible to make use of a plant comprising more than two polymerization reactors connected in series. It is preferable to restrict the system to two polymerization reactors connected in series, separated by a device which makes it possible to carry out the reduction in pressure.

In the process according to the invention, a suspension comprising a composition comprising from 30 to 70% by weight of the homopolymer (A) and from 30 to 70% by weight of the copolymer (B) is collected at the outlet of the subsequent polymerization reactor. The composition comprising ethylene polymers can be separated from the suspension by any known means. The suspension is usually subjected to a reduction in pressure (final reduction in pressure), so as to remove the diluent, the ethylene, the hexene and, optionally, the hydrogen from the composition. According to an alternative form of the process according to the invention and more particularly when the diluent is isobutane, the gases exiting from the first reduction in pressure (intermediate reduction in pressure between the two polymerization reactors) and from the final reduction in pressure are mixed, compressed and conveyed to a distillation unit. This distillation unit is advantageously composed of one or of two distillation columns in series. Ethylene and hydrogen are withdrawn at the column top, a mixture of isobutane and of hexene is withdrawn at the column bottom and isobutane devoid of hexene is withdrawn from an intermediate plate. The isobutane-hexene mixture is then recycled in the subsequent polymerization reactor, whereas the isobutane devoid of hexene is recycled in the first reactor.

The process according to the invention makes it possible to obtain, with a good yield and with a low content of oligomers, a composition comprising ethylene polymers exhibiting a very good compromise between the mechanical properties and the processing properties.

The invention consequently also relates to a composition comprising ethylene polymers comprising from 30 to 70% by weight with respect to the total weight of the composition of an ethylene homopolymer (A) having a melt flow index $MI_2$ of 5 to 1000 g/10 min and from 30 to 70% by weight with respect to the total weight of the composition of a copolymer of ethylene and of hexene (B) having a melt flow index $MI_5$ of 0.01 to 2 g/10 min capable of being obtained by the process according to the invention.

An essential characteristic of the composition according to the invention is that it is composed of an intimate and homogeneous mixture of the homopolymer (A) and of the copolymer (B), the copolymer (B) being prepared in the presence of the homopolymer (A). The composition is composed of particles comprising both homopolymer (A) and copolymer (B).

The amount of homopolymer (A) in the composition comprising ethylene polymers according to the invention is preferably at least 40%, more particularly at least 42%, by weight with respect to the total weight of the composition. The amount of homopolymer (A) preferably does not exceed 60% by weight. Good results have been obtained with an amount of homopolymer (A) which does not exceed 58% by weight with respect to the total weight of the composition.

The amount of copolymer (B) is preferably at least 40%, more particularly at least 42%, by weight with respect to the total weight of the composition. The amount of copolymer (B) preferably does not exceed 60% by weight. Good results have been obtained with an amount of copolymer (B) not exceeding 58% by weight with respect to the total weight of the composition.

The composition according to the invention generally comprises at least 95%, preferably at least 99%, by weight of the combination of the homopolymer (A) and of the copolymer (B). A composition composed solely of the homopolymer (A) and of the copolymer (B) is very particularly preferred.

The composition according to the invention generally exhibits a melt flow index $MI_5$ of at least 0.07 g/10 min, preferably of at least 0.1 g/10 min. The $MI_5$ of the composition usually does not exceed 10 g/10 min, preferably not 7 g/10 min. Compositions for which the $MI_5$ does not exceed 1 g/10 min are particularly preferred. The composition according to the invention advantageously exhibits an HLMI of at least 2 g/10 min which, furthermore, does not exceed 100 g/10 min.

An important characteristic of the composition according to the invention is that it exhibits a broad or bimodal molecular weight distribution. This characteristic is illustrated by the ratio of the melt flow indices measured under various loads and more specifically by the $HLMI/MI_5$ ratio. The compositions usually exhibit an $HLMI/MI_5$ ratio of greater than 10, preferably greater than 15. The $HLMI/MI_5$ ratio usually does not exceed 150. The $HLMI/MI_5$ ratio preferably does not exceed 50. In the compositions according to the invention, the ratio of the intrinsic viscosity of the copolymer (B)($\eta_B$) to that of the homopolymer (A)($\eta_A$) is generally at least 1.5, preferably at least 2. The $\eta_B/\eta_A$ ratio generally does not exceed 12, preferably not 10. A ratio which does not exceed 7 is particularly preferred.

In addition, the composition according to the invention usually exhibits a dynamic viscosity $\mu_2$, measured at 190° C. at a rate gradient of 100 s$^{-1}$, of 10 to 30,000 dpa·s. In the context of the present invention, the dynamic viscosity $\mu_2$ is determined by extrusion of the polymer at 190° C., through a die with a length of 15 mm and a diameter of 1 mm, at a constant rate corresponding to a rate gradient of 100 s$^{-1}$ and by measuring the force transmitted by the piston during its descent. The dynamic viscosity $\mu_2$ is then calculated from the relationship $\mu_2=233\times Fp$, in which Fp represents the mean force exerted by the piston, expressed in daN, during the measuring time of 30 seconds. The cylinder and the piston of the rheometer which are used for this measurement correspond to the criteria of that used for the measurement of the melt flow index according to ASTM Standard D 1238 (1986).

The compositions according to the invention generally exhibit a standard density SD, measured according to ASTM Standard D 792 (on a sample prepared according to ASTM Standard D 1928, Procedure C), of at least 930 kg/M$^3$. The compositions preferably exhibit an SD of greater than 935 kg/m$^3$. Compositions which have given good results are those for which the SD is at least equal to 940 kg/m$^3$. The SD generally does not exceed 965 kg/m$^3$; it preferably does not exceed 960 kg/m$^3$. Compositions for which the SD is less than 955 kg/m$^3$ are particularly preferred. The SD of the homopolymer (A) present in the compositions according to the invention is generally at least 960 kg/m$^3$, preferably at least 965 kg/m$^3$. A homopolymer (A) having an SD of at least 970 kg/m³ is very particularly preferred. The SD of the copolymer (B) is generally from 910 to 940 kg/m³. The SD of the copolymer (B) is preferably at least 915 kg/m³. The SD of the copolymer (B) preferably does not exceed 938 kg/m³, more particularly not 935 kg/m³.

The compositions according to the invention are suitable for being employed according to conventional processes for shaping articles and more particularly according to extrusion and extrusion blow-moulding processes.

The compositions according to the invention are well suited to the manufacture of films. The invention consequently also relates to the use of a composition according to the invention for the manufacture of films, in particular by extrusion blow-moulding, and to the films produced by use of the composition according to the invention. The compositions according to the invention make it possible to obtain films exhibiting both a beautiful surface appearance (absence of defects known as shark skin) and a good resistance to tearing and to perforation.

The compositions according to the invention are particularly well suited to the extrusion of pipes, in particular pipes for the transportation of pressurized fluids, such as water and gas. The invention consequently also relates to the use of a composition according to the invention for the manufacture of pipes. The manufacture of pipes by extrusion of a composition according to the invention is advantageously carried out on an extrusion line comprising an extruder, a sizer and a haul-off device. The extrusion is generally carried out on an extruder of the single-screw type and at a temperature of 150 to 230° C. The sizing of the pipes can be carried out by the creation of a negative pressure within the pipe and/or by the creation of an excess pressure outside the pipe.

The pipes manufactured by means of the compositions according to the invention are characterized by:
  a good resistance to slow crack propagation or environmental stress cracking resistance (ESCR), reflected by a failure time generally of greater than 2000 hours, as measured at 80° C. on a notched pipe having a diameter of 110 mm and a thickness of 10 mm and under a stress of 4.6 MPa according to the method described in ISO Standard F/DIS 13479 (1996),
  a good resistance to rapid crack propagation (RCP), reflected by a halt in crack propagation at an internal pressure generally at least equal to 12 bar, as measured at 0° C. on a pipe with a diameter of 110 mm and a thickness of 10 mm according to the S4 method described in ISO Standard F/DIS 13477 (1996), and
  a good creep resistance (τ), reflected by a failure time generally of greater than 200 hours (measured at 20° C. on a pipe having a diameter of 50 mm and a thickness of 3 mm under a circumferential stress of 12.4 MPa according to ISO Standard 1167).

The pipes manufactured by means of the compositions according to the invention are characterized in particular by a better compromise between the resistance to crack propagation (slow crack propagation and rapid crack propagation) and the creep resistance in comparison with the known compositions of the prior art. The invention consequently also relates to the pipes, more particularly the pipes for the transportation of pressurized fluids, obtained by extrusion of a composition according to the invention.

It goes without saying that, when they are used for the molten shaping of articles, the compositions according to the invention can be mixed with the usual processing additives for polyolefins, such as stabilizers (antioxidizing agents and/or anti-UV agents), antistatic agents and processing aids, as well as pigments. The invention consequently also relates to a mixture comprising a composition according to the invention and at least one of the additives described above. The mixtures comprising at least 95%, preferably at least 97%, by weight of a composition according to the invention and at least one of the additives described above are particularly preferred.

The examples which follow are intended to illustrate the invention.

The meanings of the symbols used in these examples and the units expressing the properties mentioned and the methods for measuring these properties are explained below.

Q=content of comonomer in the copolymer (B), expressed as % by weight. In the case of hexene, the content was measured as described above; in the case of butene, the butene content was also measured by NMR according to the method described above, but by using the lines characteristic of butene (11.18 and 39.6 ppm).

QT=content of comonomer in the composition, expressed as % by weight. This amount is measured as explained above for the comonomer content of the copolymer (B).

Elmendorf=resistance to tearing measured according to ASTM Standard D 1922-67; L denotes the measurement in the longitudinal direction of the film, T denotes the measurement in the transverse direction of the film.

DDT=resistance to perforation measured according to ISO Standard 7765-1 (Dart Drop Test). The values have been expressed in g per thickness of the film in μm.

The other symbols have been explained in the description.

The values labelled * have been calculated from the values measured for the polymer manufactured in the reactor 1 and for the composition resulting from the reactor 2.

EXAMPLES 1, 2, 4 AND 7 a) Preparation of the Catalyst

Magnesium diethoxide was reacted with titanium tetrabutoxide for 4 hours at 150° C. in an amount such that the molar ratio of titanium to magnesium is equal to 2. The reaction product thus obtained was subsequently chlorinated and precipitated by bringing the latter into contact with an ethylaluminium dichloride solution for 90 minutes at 45° C. The catalyst thus obtained, collected from the suspension, comprises (% by weight):

Ti: 17; Cl: 41; Al: 2; Mg: 5.

b) Preparation of the Composition

The manufacture of a composition comprising ethylene polymers was carried out in suspension in isobutane in two loop reactors connected in series separated by a device which makes it possible continuously to carry out the reduction in pressure.

Isobutane, ethylene, hydrogen, triethylaluminium and the catalyst described in point a) were continuously introduced into the first loop reactor and the polymerization of ethylene was carried out in this mixture in order to form the homopolymer (A). The said mixture, additionally comprising the homopolymer (A), was continuously withdrawn from the said reactor and was subjected to a reduction in pressure (60° C., 0.7 MPa), so as to remove at least a portion of the hydrogen. The resulting mixture, at least partially degassed of hydrogen, was then continuously introduced into a second polymerization reactor, at the same time as ethylene, hexene, isobutane and hydrogen, and the polymerization of the ethylene and of the hexene was carried out therein in order to form the copolymer (B). The suspension comprising the composition comprising ethylene polymers was continuously withdrawn from the second reactor and this suspension was subjected to a final reduction in pressure, so as to evaporate the isobutane and the reactants present (ethylene, hexene and hydrogen) and to recover the composition in the form of a powder, which was subjected to drying in order to complete the degassing of the isobutane.

The other polymerization conditions are specified in Table 1.

The properties of the final compositions are presented in Table 2.

c) Use of the Composition for the Preparation of Films.

The compositions of the various examples were used for the manufacture of films by extrusion blow-moulding through a die with a diameter of 100 mm, with a blow ratio (ratio of the diameter of the bubble to the diameter of the extrusion die) set at 4 and a neck height of 6 times the diameter of the extrusion die. The mechanical properties of the films obtained are presented in Table 2.

COMPARATIVE EXAMPLE 3R

A composition comprising ethylene polymers was manufactured in the plant and with the catalyst and the cocatalyst described in Example 1 but by using hexane as diluent and butene as comonomer in the second reactor. The other conditions are specified in Table 1.

The properties of the composition obtained are presented in Table 2.

Films were manufactured with this composition not in accordance with the invention under the same conditions as for Examples 1, 2, 4 and 7. The mechanical properties of the films obtained are also presented in Table 2.

COMPARATIVE EXAMPLES 5R AND 6R

A composition comprising ethylene polymers was manufactured in the plant and with the catalyst and the cocatalyst described in Example 1 but by using hexene as comonomer in the two polymerization reactors. The other conditions are specified in Table 1.

The properties of the compositions obtained are presented in Table 2.

Films were manufactured with these compositions not in accordance with the invention under the same conditions as for Examples 1, 2, 4 and 7. The mechanical properties of the films obtained are also presented in Table 2.

TABLE 1

| EXAMPLE | 1 | 2 | 3R | 4 | 5R | 6R | 7 |
|---|---|---|---|---|---|---|---|
| REACTOR 1 | | | | | | | |
| diluent | isobutane | isobutane | hexane | isobutane | isobutane | isobutane | isobutane |
| $C_2$ (g/kg) | 9 | 9 | 14 | 10 | 9 | 8.8 | 10 |
| comonomer | — | — | — | — | 1-hexene | 1-hexene | — |
| comon./$C_2$ (mol/mol) | 0 | 0 | 0 | 0 | 0.37 | 0.37 | 0 |
| $H_2/C_2$ (mol/mol) | 0.449 | 0.447 | 0.437 | 0.398 | 0.370 | 0.428 | 0.451 |
| T (° C.) | 85 | 85 | 85 | 85 | 85 | 85 | 85 |
| residence time (h) | 2.20 | 2.20 | 2.20 | 2.20 | 2.20 | 2.20 | 2.20 |
| REACTOR 2 | | | | | | | |
| diluent | isobutane | isobutane | hexane | isobutane | isobutane | isobutane | isobutane |
| $C_2$ (g/kg) | 32 | 33 | 13 | 35 | 35 | 38 | 38 |
| comonomer | 1-hexene | 1-hexene | 1-butene | 1-hexene | 1-hexene | 1-hexene | 1-hexene |
| comon./$C_2$ (mol/mol) | 1.52 | 1.41 | 0.82 | 2.72 | 1.76 | 1.27 | 1.64 |
| $H_2/C_2$ (mol/mol) | 0.010 | 0.011 | 0.009 | 0.016 | 0.017 | 0.021 | 0.009 |
| T (° C.) | 85 | 85 | 85 | 85 | 85 | 83 | 85 |
| residence time (h) | 1.23 | 1.23 | 1.23 | 1.27 | 1.27 | 1.23 | 1.23 |

TABLE 2

| EXAMPLE | 1 | 2 | 3R | 4 | 5R | 6R | 7 |
|---|---|---|---|---|---|---|---|
| polym. manufactured react. 1 | homopolymer | homopolymer | homopolymer | homopolymer | $C_2$–$C_6$ copo | $C_2$–$C_6$ copo | homopolymer |
| weight (%) | 45 | 45 | 45 | 55 | 55 | 45 | 45 |
| $MI_2$ (g/10 min) | 99.8 | 97.6 | 101.5 | 116 | 121 | 133 | 102 |
| $\eta_A$ (dl/g) | 0.84 | 0.84 | 0.84 | 0.81 | 0.81 | 0.79 | 0.84 |
| SD (kg/m³) | 968 | 969 | 969 | 968 | 962 | 961 | 967 |
| polym. manufactured react. 2 | $C_2$–$C_6$ copo | $C_2$–$C_6$ copo | $C_2$–$C_4$ copo | $C_2$–$C_6$ copo | $C_2$–$C_6$ copo | $C_2$–$C_6$ copo | $C_2$–$C_6$ copo |
| weight (%) | 55 | 55 | 55 | 45 | 45 | 55 | 55 |
| $MI_5$ * (g/10 min) | 0.04 | 0.05 | 0.05 | 0.015 | 0.015 | 0.04 | 0.04 |
| SD * (kg/m³) | 937.5 | 935 | 936.8 | 926.8 | 935.7 | 939.7 | 936.5 |
| Q * (weight %) | 2.84 | 2.62 | 2.33 | 5.07 | 3.28 | 2.37 | 3.05 |
| composition resulting react. 2 | | | | | | | |
| QT (weight %) | 1.56 | 1.44 | 1.28 | 2.28 | 1.86 | 1.62 | 1.68 |
| $MI_5$ (g/10 min) | 0.31 | 0.35 | 0.37 | 0.23 | 0.22 | 0.28 | 0.30 |
| HLMI (g/10 min) | 5.7 | 6.1 | 7.4 | 6.6 | 6.7 | 5.7 | 5.7 |
| SD (kg/m³) | 951 | 950 | 951 | 949 | 950 | 949 | 950 |
| $\mu_2$ (dPa.s) | 27,200 | 27,500 | 25,200 | 22,600 | 22,300 | 26,200 | 26,600 |
| Film properties | | | | | | | |
| film thick. ($\mu$m) | 29 | 30 | 31 | 32 | 32 | 32 | 28 |

TABLE 2-continued

| EXAMPLE | 1 | 2 | 3R | 4 | 5R | 6R | 7 |
|---|---|---|---|---|---|---|---|
| DDT (g/µm) | 8.4 | 7.6 | 6.7 | 10.8 | 9.5 | 8.5 | 10.0 |
| Elmendorf L (g) | 26 | 26 | 23 | | | 42 | 26 |
| Elmendorf T (g) | 355 | 305 | 312 | | | 379 | 288 |

Table 2 shows that the compositions comprising a homopolymer and an ethylene/hexene copolymer which are obtained by the process according to the invention exhibit better mechanical properties (resistance to tearing and resistance to perforation) in comparison with a composition comprising butene instead of hexene (Ex. 1 and 2 in comparison with Ex. 3R) and in comparison with compositions comprising two hexene copolymers (Ex. 4 in comparison with Ex. 5R and Ex. 7 in comparison with Ex. 6R).

EXAMPLES 8 AND 9R

These examples were carried out in the plant and with the catalyst and the cocatalyst described in Example 1. The polymerization conditions in the two reactors are summarized in Table 3.

TABLE 3

| EXAMPLE | 8 | 9R |
|---|---|---|
| diluent | Isobutane | Hexane |
| REACTOR 1 | | |
| $C_2$ (g/kg) | 14.9 | 10.7 |
| $H_2/C_2$ | 0.46 | 0.38 |
| T (° C.) | 85 | 85 |
| residence time (h) | 2.3 | 3.1 |
| REACTOR 2 | | |
| $C_2$ (g/kg) | 21.9 | 14.9 |
| comonomer | Hexene | Butene |
| comonom./$C_2$ | 1.61 | 0.89 |
| $H_2/C_2$ | 0.0048 | 0.0033 |
| T (° C.) | 75 | 75 |
| residence time (h) | 1.3 | 1.93 |

The properties of the final compositions are summarized in Table 4.

997 parts of the composition obtained were mixed with 2 parts of an antioxidizing agent and 1 part of an anti-UV agent and the mixture was granulated by extrusion in an extruder at a temperature of 230° C.

Pipes were then manufactured by extrusion of these granules on an extruder of single-screw type at 200° C. The properties measured on these pipes are taken up in Table 4. It is evident that the composition comprising an ethylene-hexene copolymer (Ex. 8) exhibits a better compromise between the resistance to crack propagation (resistance to slow crack propagation and resistance to rapid crack propagation) and the creep resistance in comparison with a composition comprising an ethylene-butene copolymer (Ex. 9R).

TABLE 4

| EXAMPLE | 8 | 9R |
|---|---|---|
| Polymer manufactured in reactor 1 | Homo | homo |
| weight (%) | 50.2 | 50.8 |
| $MI_2$ (g/10 min) | 575 | 468 |

TABLE 4-continued

| EXAMPLE | 8 | 9R |
|---|---|---|
| $\eta_A$ (dl/g) | 0.59 | 0.62 |
| SD (kg/m³) | 973 | 972 |
| Polymer manufactured in reator 2 | $C_2$—$C_6$ copo | $C_2$—$C_4$ copo |
| weight (%) | 49.8 | 49.2 |
| $MI_5^*$ (g/10 min) | 0.03 | 0.025 |
| SD* (kg/m³) | 927.1 | 925.8 |
| Q* (weight %) | 3 | 2.5 |
| Composition resulting from react. 2 | | |
| QT (weight %) | 1.5 | 1.24 |
| $MI_5$ (g/10 min) | 0.31 | 0.31 |
| SD (kg/m³) | 949.6 | 948.7 |
| $\mu_2$ (dPa.s) | 22,100 | 20,500 |
| ESCR (h) | >7224 | 7344 |
| RCP (bar) at 0° C. | >12 | >12 |
| at −15° C. | >12 | >12 |
| τ (h) | 1780 | 235 |

EXAMPLE 10

This example was carried out in the plant of Example 1, with a catalyst comprising, as % by weight, Ti: 5; Zr: 18; Cl: 45; Al: 5; Mg: 6 and triisobutyl-aluminium as cocatalyst. The polymerization conditions in the two reactors are summarized in Table 5.

TABLE 5

| EXAMPLE | 10 |
|---|---|
| Diluent | Isobutane |
| REACTOR 1 | |
| $C_2$ (g/kg) | 25.2 |
| $H_2/C_2$ | 0.47 |
| T (° C.) | 85 |
| residence time (h) | 3.29 |
| REACTOR 2 | |
| $C_2$ (g/kg) | 29.8 |
| Comonomer | hexene |
| comonom./$C_2$ | 1.32 |
| $H_2/C_2$ | 0.0048 |
| T (° C.) | 75 |
| residence time (h) | 1.86 |

The properties of the final compositions are summarized in Table 6.

997 parts of the composition obtained were mixed with 2 parts of an antioxidixing agent and 1 part of an anti-UV agent and the mixture was granulated by extrusion in an extruder at a temperature of 230° C.

Pipes were then manufactured by extrusion of these granules on an extruder of single-screw type at 200° C. The properties measured on these pipes are taken up in Table 6.

TABLE 6

| EXAMPLE | 10 |
|---|---|
| Polymer manufactured in reactor 1 | homo |
| weight (%) | 53.4 |
| $MI_2$ (g/10 min) | 400 |
| SD (kg/m³) | 971.8 |
| Polymer manufactured in reator 2 | $C_2$—$C_6$ copo |
| weight (%) | 46.6 |
| $MI_5$* (g/10 min) | 0.04 |
| SD* (kg/m³) | 923.5 |
| Q* (weight %) | 3 |
| Composition resulting from react. 2 | |
| QT (weight %) | 1.4 |
| $MI_5$ (g/10 min) | 0.54 |
| SD (kg/m³) | 948.7 |
| $\mu_2$ (dPa.s) | 19,100 |
| ESCR (h) | >3600 |

Belgin Patent Application 09700694 is hereby incorporated herein by reference.

What is claimed is:

1. Process for the manufacture of a composition comprising ethylene polymers, in at least two polymerization reactors connected in series, according to which:

in a first reactor, ethylene is polymerized in suspension in a first mixture comprising a diluent, hydrogen, a catalyst based on a transition metal and a non-halogenated organoaluminum cocatalyst having the formula $AlR_3$, wherein R represents a $C_{1-8}$ alkyl group, so as to form from 30 to 70% by weight with respect to the total weight of the composition of an ethylene homopolymer (A) having a melt flow index $MI_2$ of 5 to 1000 g/10 min, to form a second mixture comprising hydrogen and said homopolymer (A), said second mixture is withdrawn from said reactor and is subjected to a reduction in pressure, so as to degas at least a portion of the hydrogen to form an at least partially degassed mixture, then said at least partially degassed mixture, together with ethylene and 1-hexene and, optionally, at least one other α-olefin, are introduced into a subsequent reactor and the suspension polymerization is carried out therein in order to form from 30 to 70% by weight, with respect to the total weight of the composition, of a copolymer of ethylene and of hexene (B) having a melt flow index $MI_5$ of 0.01 to 2 g/10 min.

2. Process according to claim 1, characterized in that the hexene content in the copolymer (B) is at least 0.4% and at most 10% by weight.

3. Process according to claim 1, characterized in that the copolymer (B) is composed essentially of monomer units derived from ethylene and from 1-hexene.

4. Process according to claim 1, characterized in that the homopolymer (A) exhibits an $MI_2$ of at least 50 and not exceeding 700 g/10 min and that the copolymer (B) exhibits an $MI_5$ of at least 0.015 and not exceeding 0.1 g/10 min.

5. Process according to claim 1, characterized in that the diluent is isobutane.

6. Process according to claim 1, characterized in that the amount of hydrogen introduced into the first reactor is adjusted so as to obtain, in the diluent, a molar ratio of hydrogen to ethylene of 0.05 to 1.

7. Process according to claim 1, characterized in that the ratio of the concentration of hydrogen in the first reactor to the concentration in the subsequent polymerization reactor is at least 20.

8. Process according to claim 1, characterized in that the amount of 1-hexene introduced into the subsequent polymerization reactor is such that, in this reactor, the hexene/ethylene molar ratio in the diluent is from 0.05 to 3.

9. Process according to claim 1, characterized in that the catalyst comprises from 10 to 30% by weight of transition metal, from 0.5 to 20% by weight of magnesium, from 20 to 60% by weight of a halogen and from 0.1 to 10% by weight of aluminium.

* * * * *